(12) United States Patent
Iyer et al.

(10) Patent No.: US 11,575,664 B2
(45) Date of Patent: Feb. 7, 2023

(54) INFORMATION HANDLING SYSTEMS AND METHODS TO MANAGE TICKETS BASED ON USER PRESENCE, SYSTEM STATE AND TICKET MANAGEMENT POLICY

(71) Applicant: DELL PRODUCTS L.P., Round Rock, TX (US)

(72) Inventors: Vivek Viswanathan Iyer, Austin, TX (US); Daniel L. Hamlin, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 266 days.

(21) Appl. No.: 16/664,193

(22) Filed: Oct. 25, 2019

(65) Prior Publication Data
US 2021/0126909 A1 Apr. 29, 2021

(51) Int. Cl.
*H04L 29/06* (2006.01)
*H04L 9/40* (2022.01)

(52) U.S. Cl.
CPC .......... *H04L 63/0807* (2013.01); *H04L 63/06* (2013.01); *H04L 63/0861* (2013.01)

(58) Field of Classification Search
CPC . H04L 63/0807; H04L 63/0861; H04L 63/06; H04L 63/20; G06F 21/00
USPC ........................................................ 726/10
See application file for complete search history.

(56) References Cited

U.S. PATENT DOCUMENTS

| | | | | |
|---|---|---|---|---|
| 7,299,211 | B2* | 11/2007 | Komori | G06Q 30/06 705/64 |
| 8,836,530 | B1* | 9/2014 | Bowers | G06F 21/31 340/687 |
| 9,378,342 | B2 | 6/2016 | Robison et al. | |
| 2006/0048212 | A1* | 3/2006 | Tsuruoka | H04L 9/0866 726/4 |
| 2012/0321087 | A1* | 12/2012 | Fleischman | H04L 9/3234 380/279 |
| 2018/0321731 | A1* | 11/2018 | Alfano | G06F 1/3265 |

(Continued)

OTHER PUBLICATIONS

A Secure and Flexible Electronic-Ticket System, Khan et al, Jul. 2009 (Year: 2009).*

(Continued)

*Primary Examiner* — Jahangir Kabir
(74) *Attorney, Agent, or Firm* — Egan, Enders & Huston LLP

(57) ABSTRACT

Embodiments of information handling systems (IHSs) and methods are provided herein for managing tickets based on contextual information and ticket management policy. Although not strictly limited to such, the embodiments disclosed herein may be used to manage tickets, which are issued by a network authentication service and stored within a key store of an IHS. In one embodiment, tickets are managed by receiving user presence information and system state information, comparing the user presence information and system state information to policies contained within a ticket management policy database, and performing one or more actions specified in the policies if the user presence information or the system state information is not compliant with at least one of the policies. The one or more actions specified in the policies may include actions for managing the tickets stored within the key store and/or actions for controlling a power state of the IHS.

29 Claims, 7 Drawing Sheets

(56) References Cited

U.S. PATENT DOCUMENTS

2019/0116173 A1    4/2019   Robison et al.
2019/0222571 A1    7/2019   Fausak et al.

OTHER PUBLICATIONS

Dell EMC, District Defend, Government & Commercial Security, Powerful, zone based security for sensitive data on mobile devices, 2018, 9 pgs.
Ahmed et al., "Systems and Methods for Leveraging Authentication for Cross Operating System Single Sign On (SSO) Capabilities", DELL:271, U.S. Appl. No. 16/529,317, filed Aug. 1, 2019, 29 pgs.
Microsoft Docs, "Credentials Processes in Windows Authentication", Oct. 2016, 20 pgs.
Hamlin et al., "Human Presence Detection & Management", Dell Whitepaper, Aug. 2019, 10 pgs.
Wikipedia, Kerberos (protocol), Printed from Internet Jul. 6, 2019, 7 pgs.
Microsoft Docs, "Kerberos Authentication Overview", Oct. 2016, 3 pgs.
Rouse, "Kerberos", SearchSecruity.com, Aug. 31, 2016, 2 pgs.
"Windows Logon Scenarios", Oct. 11, 2016, 7 pgs.

\* cited by examiner

| | User Presence | Geographic Location | Wireless Pairing | Actions |
|---|---|---|---|---|
| 200 | Yes | Primary facility | Any | Maintain tickets |
| 210 | No | Primary facility | Any | Lock user session, maintain tickets |
| 220 | Yes | Secured location w/ in Primary facility | No | Quarantine tickets |
| 230 | Any | 2$^{nd}$ tier facility | No | Lock IHS |
| 240 | No | Any location | Any | Remove Workspace One ticket |
| 250 | No | Non-secured location | No | Destroy all tickets |

FIG. 4

INFORMATION HANDLING SYSTEMS AND METHODS TO MANAGE TICKETS BASED ON USER PRESENCE, SYSTEM STATE AND TICKET MANAGEMENT POLICY

FIELD

This invention relates generally to information handling systems, and more particularly, to information handling systems and methods to manage tickets that are issued to an information handling system by a network authentication service.

BACKGROUND

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With the prevalence of information handling systems in today's society, and the increased connectivity between such systems, comes a need to enhance security within information handling systems and between network connected systems, devices, services and resources. Without having security measures in place, there exists a potential for a user or system to gain access to an information handling system (IHS), or to network resources or services connected to the IHS.

Security services or programs are often provided within the operating system (OS) of an IHS to control access to computing resources, data and/or program code contained within the IHS. In general, OS level security services may grant access to computing resources, data and/or program code contained within an IHS based on authentication, identity and other security related context. Today, most security related context capture and authentication happens at machine boot or user login, and is not dynamic or continuous. This means that once an authorized user is permitted access to the IHS, the opportunities for an unauthorized user or system to gain access to the IHS, or to network resources or services, expand dramatically.

In some cases, user authentication may be performed (e.g., via password, fingerprint, facial recognition, etc.) when a user logs in to a booted operated system (OS), such as Microsoft Windows®. Once the user is authenticated, the OS maintains tokens obtained as a result of the post-boot authentication process in a local cache. When the user attempts to access a new resource for which the user has not been authenticated or authorized to use, the OS retrieves the tokens stored within the local cache and uses them to authenticate the user to the new resource.

In other cases, user authentication may be performed in the pre-boot environment before the OS is booted. For example, a pre-boot authentication (PBA) service may be used to authenticate a user in the pre-boot environment (e.g., by requiring the user to input a PIN, startup key or both) before the contents of the system hard drive are made available to the processing device. Once the OS is booted, the PBA service provides passing candidate credentials to the OS to single sign on (SSO) the user to the OS.

Information handling systems are often coupled across a network to additional network resources and service servers (such as, e.g., a print server, media server, file share server, etc.), which may require user re-authentication to access. Once a user is logged on to the operating system of an IHS (or client device), for example, the user may attempt to access a shared network resource and service server by sending a service request over a potentially untrusted network. For security purposes, a network authentication service is often used to authenticate service requests sent from client devices across a network, so that only authorized users may gain access to shared network resources and service servers.

FIG. 1 is a functional block diagram of a known network authentication service (e.g., Kerberos) that can be used to authenticate service requests between client devices and servers across a network. In the Kerberos protocol, a key distribution center (KDC) 10 is used to authenticate users and issue tickets to authorized users for accessing network resources and service servers (SS) 40. More specifically, KDC 10 is a domain service, which includes an authentication service (AS) 12 and a ticket granting service (TGS) 14. The AS 12 issues ticket-granting tickets (TGTs) to an authorized user of client device 20 for connecting to the TGS 14 in its domain or another trusted domain. Once a TGT is received, client device 20 may request and receive a session ticket from the TGS 14 to access network resources or service servers 40 in the domain of the TGS. Although illustrated as separate servers in FIG. 1, AS 12 and TGS 14 may physically run within the same server, while performing their separate roles.

To begin the network authentication process, client device 20 sends a session key request to AS 12 to access a network resource or service server 40, along with the client's username and domain password. If the client device's username is not in the KDC database, the client device cannot be authenticated and the authentication process ends. If the client device's username is found in the KDC database, AS 12 retrieves the client device's private key and generates a session key and a ticket granting ticket (TGT). The TGT is timestamped, encrypted with the client device's password and sent to the client device along with the session key.

Upon receiving an encrypted TGT and session key, a user of client device 20 may be prompted to enter a password. If the entered password matches the password in the KDC database, the encrypted TGT is decrypted, stored in a local credentials cache or key store 30 and used to request a session ticket from TGS 14 for accessing a network resource or service server 40 within the TGS's domain. To request access, client device 20 sends the TGT to the ticket granting service 14, which verifies trust with the network resource or service server 40. If the client device/user is authorized to access the network resource or service server 40, TGS 14 provides a timestamped session ticket to the client device that is stored within the local key store 30.

Once a timestamped session ticket is received from TGS 14, client device 20 may use the session ticket to gain access to any number of shared network resources/services for a specified time period without the need to re-authenticate the client device/user. Just having a session ticket proves to the authentication service that the client device is trusted and is authorized to access the shared network resources/services. When the session ticket expires at the end of the specified time period, the session ticket is no longer valid and access to the network resource or service server 40 is revoked.

One problem with the Kerberos protocol is that session tickets may be valid for a relatively long period of time (e.g., a number of hours up to a week or more), and often persist through several user login cycles. This leaves the system and the network open to potential security problems. For example, if a system is set to infinite do not lock/sleep mode and an authorized user (e.g., a user that has been authenticated by the network authentication service) steps away from their system, an unauthorized user may gain access to the system and any network resources/services for which the authorized user was authenticated.

The Microsoft Windows OS provides a rudimentary ticket management solution, which retains session tickets until they expire and/or revokes session tickets when a user logs out of the OS or requests access to a new resource. However, the solution provided by the Windows OS fails to consider user presence and other system state information, and therefore, cannot revoke or manage tickets when an authorized user temporarily leaves their system.

BAH District Defend and Dell nervousness detection logic are examples of conventional security policy enforcement solutions. BAH District Defend is custom solution designed to lock an information handling system when the system crossed over a radio frequency identification (RFID) boundary, and therefore, provides the ability to secure the system without mandating system power and data loss. The nervousness detection logic provided by Dell uses system level clues to verify login actions, thereby providing dynamic system management functions to ensure that the system can perform runtime management. Although the BAH District Defend and Dell nervousness detection logic solutions provide system/session management functions, they are not configured to manage or interact directly with session tickets, and thus, are not ticket management solutions.

SUMMARY OF THE INVENTION

The following description of various embodiments of information handling systems and related methods is not to be construed in any way as limiting the subject matter of the appended claims.

To improve system and network security, the present disclosure provides various embodiments of improved information handling systems and methods for managing tickets based on contextual information (such as user presence and system state information) and ticket management policy. Although not strictly limited to such, the systems and methods disclosed herein may be used, in some embodiments, to manage ticket granting tickets (TGTs) and/or session tickets, which are generated by a network authentication service (such as Kerberos). As described in more detail below, the systems and methods disclosed herein may manage tickets by receiving user presence information and system state information, comparing the user presence information and system state information to policies contained within a ticket management policy database, and performing one or more actions if the user presence information or the system state information is not compliant with one or more of the policies.

According to one embodiment, an information handling system (IHS) in accordance with the present disclosure may generally include a system memory, a computer readable storage device and a host processor. The system memory may include a key store for storing tickets supplied to the IHS by a network authentication service. The computer readable storage device may be configured to store an operating system (OS), a ticket management service for managing the tickets stored within the key store, and a ticket management policy database containing policies that specify actions performed by the ticket management service based on user presence and system state. The host processor may be configured to execute program instructions contained within the ticket management service during OS runtime to: receive user presence information and system state information; compare the user presence information and the system state information to the policies contained within ticket management policy database; and perform one or more actions specified in the policies if the user presence information or the system state information is not compliant with at least one of the policies. In some embodiments, the host processor may begin executing the program instructions contained within the ticket management service when a user logs into the IHS, and may continue to execute the program instructions until the user logs out of the IHS.

In some embodiments, the information handling system may include one or more sensors for collecting sensor data used to generate the user presence information, and a plurality of hardware and software components for collecting the system state information. In some embodiments, the one or more sensors may include one or more of the following: a camera, an eye tracking device, a time-of-flight sensor, a motion sensor, an infrared (IR) sensor, a temperature sensor, an acoustic sensor, a vibration sensor, a proximity sensor and radar. In some embodiments, the plurality of hardware and software components may include two or more of the following: the operating system, a driver layer, an embedded controller, a network interface controller, a Bluetooth controller, an audio controller, a Universal Serial Bus (USB) controller, a Global Positioning System (GPS) sensor, an accelerometer, a gyroscope, and a laptop hinge rotation sensor.

In some embodiments, the information handling system may include an integrated sensor hub (ISH), which is coupled to the one or more sensors and the plurality of hardware and software components. When an ISH is included, the ISH may be configured to evaluate and/or consolidate the user presence information and the system state information before sending the user presence information and the system state information to the ticket management service. When an ISH is omitted, the sensor data collected by the one or more sensors and the system state information collected by the plurality of hardware and software components may be supplied directly to the ticket management service.

The one or more actions specified in the policies may include actions for managing the tickets stored within the key store and/or actions for controlling a power state of the IHS. In some embodiments, the actions for managing the tickets may include destroying one or more of the tickets stored within the key store. In some embodiments, the actions for managing the tickets may include temporarily removing one or more tickets from the key store when the user presence information or the system state information is not compliant with the at least one of the policies, and reinserting the one or more tickets into the key store when the user presence information and the system state information are back in compliance with the policies. In some embodiments, the actions for controlling the power state of the IHS may include locking, suspending or powering down the IHS.

According to another embodiment, a method is provided herein for managing tickets that are issued to an information handling system (IHS) by a network authentication service when an authorized user logs into the IHS. The method described herein is a computer implemented method performed by a processing device of the IHS when an authorized user logs into the IHS. To perform the computer implemented method, the processing device may execute program instructions contained within a ticket management service stored within a computer readable storage device of the IHS The computer implemented method described herein may generally include receiving user presence information and system state information from at least one IHS component; determining if the user presence information and the system state information are compliant with ticket management policies stored within the IHS; and performing one or more actions specified in at least one of the ticket management policies if the user presence information or the system state information is not compliant with the at least one ticket management policy. If the user presence information and the system state information are compliant with the ticket management policies, the computer implemented method may continue to receive user presence and system state information and determine if the user presence and system state information are compliant with ticket management policies until the authorized user logs out of the IHS.

In some embodiments, the one or more actions may include quarantining or destroying one or more tickets, which are issued by the network authentication service and stored within a key store of the IHS. In some embodiments, quarantining may include temporarily removing the one or more tickets from the key store when the user presence information or the system state information is not compliant with the at least one ticket management policy; and reinserting the one or more tickets into the key store when user presence information and the system state information are back in compliance with the ticket management policies.

In some embodiments, the one or more actions may include controlling a power state of the IHS. In some embodiments, controlling a power state of the IHS may include locking, suspending or powering down the IHS.

BRIEF DESCRIPTION OF THE DRAWINGS

Other advantages of the present disclosure will become apparent upon reading the following detailed description and upon reference to the accompanying drawings in which:

FIG. 4 is a table of example ticket management policies;

Figure 1:
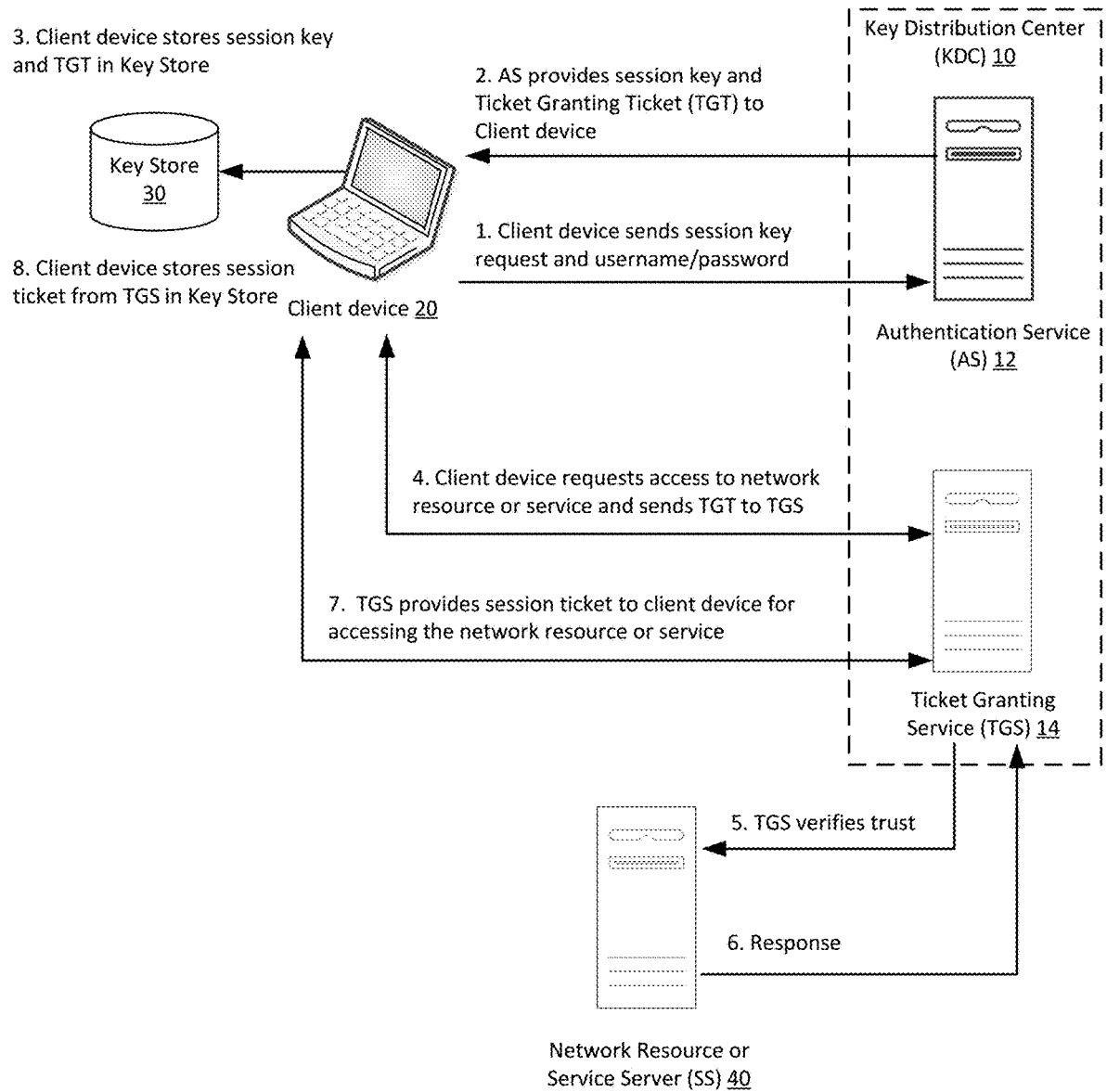
FIG. 1 (prior art) is a functional block diagram of a network authentication service, which uses a key distribution center (KDC) to authenticate users and issue tickets for accessing shared network resources and services.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

Figure 2:
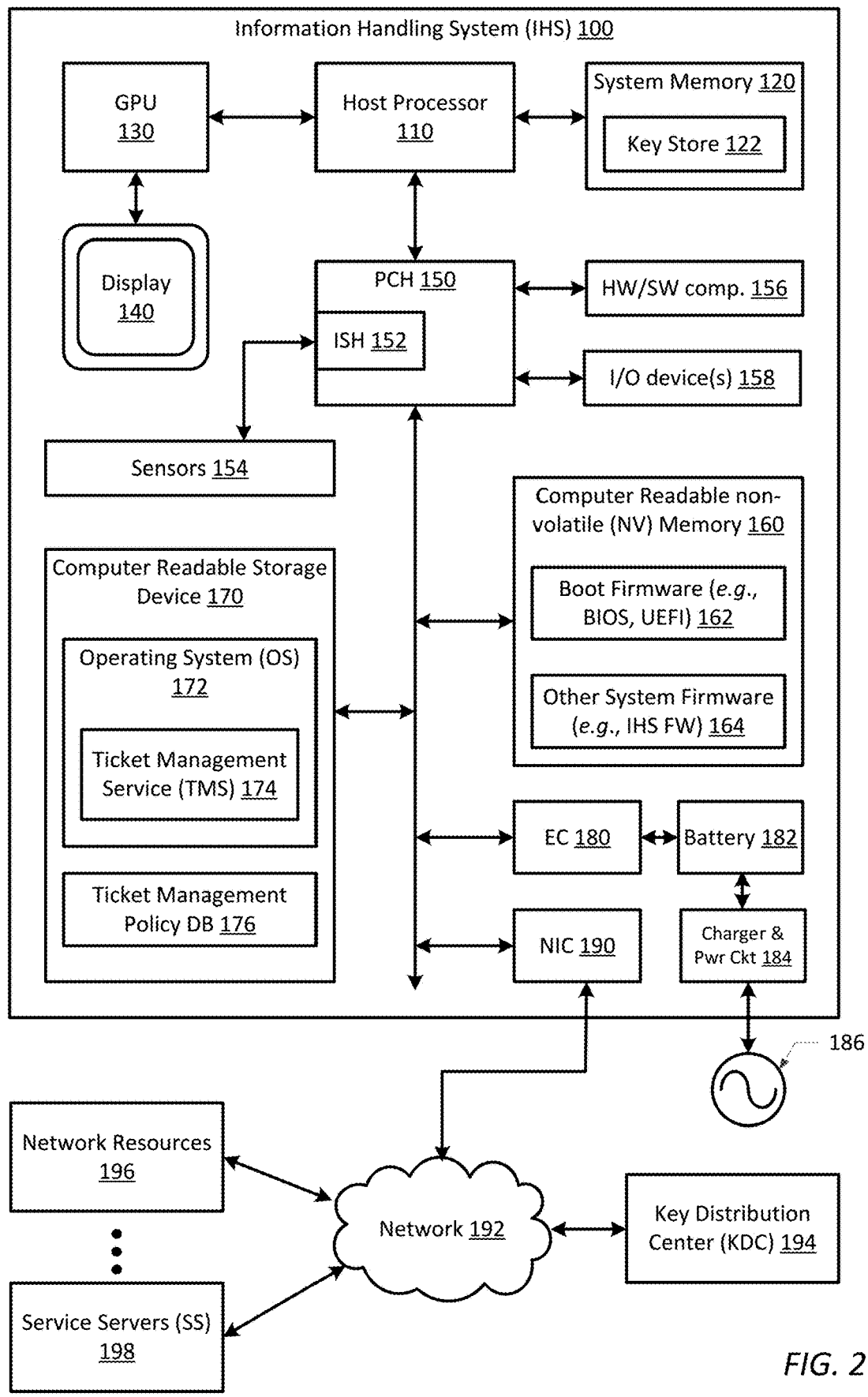
FIG. 2 is a block diagram illustrating one embodiment of an information handling system (IHS) that includes an OS-based ticket management service (TMS) for managing tickets issued to the IHS by a network authentication service.

FIG. 2 is a block diagram of an information handling system 100 (e.g., a desktop computer, laptop computer, tablet computer, server, Internet of Things (IoT) device, etc.) as it may be configured according to one embodiment of the present disclosure. As shown in FIG. 2, IHS 100 may generally include at least one processing device (e.g., host processor) 110, a system memory 120, a graphics processor unit (GPU) 130, a display device 140, a platform controller hub (PCH) 150 having an integrated sensor hub (ISH) 152, a plurality of sensors 154 coupled to the ISH 152, additional hardware/software components 156, one or more input/output (I/O) devices 158, a computer readable non-volatile (NV) memory 160, a computer readable storage device 170, an embedded controller (EC) 180 and a network interface controller (NIC) 190.

It is expressly noted that the IHS configuration shown in FIG. 2 is exemplary only, and that the methods disclosed herein may be implemented on any type and/or configuration of information handling system having one or more processing devices, a computer readable non-volatile memory, a computer readable storage device, a sensor hub and sensors, and a network interface controller. It will be further understood that while certain components of the information handling system are shown in FIG. 2 for illustrating embodiments of the present disclosure, the information handling system disclosed herein is not restricted to including only those components shown in FIG. 2 and described below.

Host processor 110 may include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). According to one embodiment, host processor 110 may include at least one central processing unit (CPU) having one or more processing cores. The CPU may include any type of processing device, such as an Intel Pentium series processor, an Advanced Micro Devices (AMD) processor or another processing device.

System memory 120 is coupled to host processor 110 and generally configured to store program instructions (or computer program code), which are executable by host processor 110. System memory 120 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

As shown in FIG. 2, system memory 120 includes a local credentials cache or key store 122 for storing credentials (e.g., session keys, ticket granting tickets, TGTs, and/or session tickets), which are issued to IHS 100 after a user of the IHS is authenticated by a network authentication service (e.g., Kerberos). Key store 122 stores credentials while they remain valid, so that the IHS doesn't need to repeatedly contact the authentication service every time a user needs to be authenticated to a network resource or service (e.g., when connecting to a web or mail server multiple times). Key store 122 usually contains one initial ticket, which is obtained using a password or another form of identity verification. If the initial ticket is a TGT, it can be used to obtain additional credentials (e.g., one or more session tickets) without the password. In some embodiments, a plurality of TGT and session tickets may be stored within key store 122 in a Kerberos keychain. When a ticket expires and/or becomes invalid, the ticket is removed from the Kerberos keychain and deleted from the key store 122.

Graphics processor unit (GPU) 130 is coupled to host processor 110 and configured to coordinate communication between the host processor and one or more display components of the IHS. In the embodiment shown in FIG. 2, GPU 130 is coupled to display device 140 and configured to provide visual images to the user. In some embodiments, GPU 130 may be coupled to one or more display ports to support additional display functions. Although GPU 130 is shown as a separate processing device in the embodiment of FIG. 2, GPU 130 may be omitted in other embodiments, when the functionality provided thereby is integrated within host processor 110 in a system-on-chip (SoC) design. In some embodiments, IHS 100 may include other types of processing devices including, but not limited to, a graphics-derivative processor (such as a physics/gaming processor), a digital signal processor (DSP), and embedded controller, etc.

Platform controller hub (PCH) 150 (otherwise referred to as a Southbridge controller or chipset) is coupled to host processor 110 and configured to handle I/O operations for the IHS. As such, PCH 150 may include a variety of communication interfaces and ports for communicating with various system components, such as additional hardware/software components 156, input/output (I/O) devices 158, computer readable NV memory 160, computer readable storage device 170, EC 180 and NIC 190.

In some embodiments, PCH 150 may include an integrated sensor hub (ISH) 152 for receiving and processing sensor data and other system data. Alternatively, an external sensor hub (not shown) could be communicatively coupled to PCH 150 for receiving and processing sensor data and system data. Including a sensor hub within the IHS enables sensor polling and algorithm processing to be offloaded to a dedicated low power co-processor, so that the host processor can enter low power modes more often, resulting in power savings. Although beneficial for power savings and other advantages, a sensor hub is not strictly necessary to implement the inventive concepts disclosed herein and may be omitted from IHS 100 in some embodiments.

When included within IHS 100, ISH 152 may be coupled to receive sensor data from a plurality of sensors 154 that can be used to generate user presence information. Example sensors 154 that may be used to generate user presence information include, but are not limited to, a camera, an eye tracking device, a time-of-flight sensor, a motion sensor, an infrared (IR) sensor, a temperature sensor, an acoustic sensor, a vibration sensor, a proximity sensor, radar and other types of sensors that can be used detect user presence. In one example, an image captured by a camera or eye tracking device can be used to detect user presence (or absence) by determining, from the image, if a user is physically present at the IHS. In another example, a time-of-flight sensor may be used to detect user presence (or absence) by using reflections of light off objects/users to calculate a time-of-flight and distance between the time-of-flight sensor and the object/user.

In some embodiments, ISH 152 and/or ticket management service 174 may analyze the sensor data collected by sensors 154 to generate user presence information. For example, the sensor data may be analyzed to determine: (a) if a user is physically present at the IHS (i.e., user presence), (b) if a previously present user has left the IHS for at least a specified duration of time (i.e., user absence), (c) if there is significant movement of the user in a location, pattern or velocity that is different from a learnt behavior, etc.

In some embodiments, ISH 152 may also receive system state information from a plurality of hardware and/or software components of the IHS. Example hardware and software components that may be used to provide system state information to ISH 152 include, but are not limited to, OS 172, driver layer 178, EC 180, and NIC 190. In some embodiments, ISH 152 may be coupled to receive geographic location and system performance data from OS 172, battery state information, thermal and power management information and/or out-of-band manageability in power states S1-S5 information from EC 180 and/or network information from NIC 190. In addition, driver layer 178 may aggregate data received from other system drivers (e.g., wireless, audio, etc., drivers) and send the aggregate data to ISH 152 as system state information. In some embodiments, driver layer 178 may also perform logical user presence aggregation using OS cues and may send the aggregation to ISH 152 as user presence information.

In some embodiments, additional hardware/software components 156 may be included within IHS 100 to perform additional functions for the IHS. Example hardware/software components 156 include, but are not limited to, a Bluetooth controller, an audio controller, a Universal Serial Bus (USB) controller, a Global Positioning System (GPS) sensor, an accelerometer, a gyroscope, a laptop hinge rotation sensor, etc. In some embodiments, the additional hardware/software components 156 may also be used to provide system state information to ISH 152. For example, ISH 152 may be coupled to receive a wireless pairing state of a Bluetooth device from a Bluetooth controller, audio activity (e.g., a 3D time-of-flight location of a user, multiuser information and/or audio speaker recognition) from an audio controller, and/or a current connection state of a USB device from a USB controller. In addition or alternatively, ISH 152 may be coupled to receive geographic location information form a GPS sensor, acceleration information from an accelerometer, orientation and angular velocity information from a gyroscope and/or lid position or display mode (e.g., laptop or tablet mode) from a laptop hinge rotation sensor.

In some embodiments, ISH 152 may supply the user presence information and the system state information to ticket management service 174. In other embodiments, ISH 152 may evaluate and/or consolidate the user presence and system state information to reduce the amount of data supplied to the ticket management service. In yet other embodiments, ISH 152 may be omitted, and the sensor data and system state information may be supplied directly from sensors 154, hardware/software components 156, OS 172, driver layer 178, EC 180, and NIC 190 to ticket management service 174.

I/O devices 158 enable the user to interact with IHS 100, and to interact with software/firmware executing thereon. In some embodiments, one or more I/O devices 158 may be present within, or coupled to, IHS 100. In some embodiments, I/O device(s) 158 may be separate from the IHS and may interact with the IHS through a wired or wireless connection. Examples of I/O devices 158 include, but are not limited to, keyboards, keypads, touch screens, mice, scanning devices, voice or optical recognition devices, and any other devices suitable for entering or retrieving data. In some embodiments, a user of the IHS may utilize one or more of the I/O devices 158 to provide input (e.g., a PIN, password, passphrase, fingerprint, facial image, startup key, etc.) to the system for authentication purposes.

Computer readable memory 160 may include any type of non-volatile (NV) memory including, but not limited to, read-only memory (ROM), Flash memory (e.g., Serial Peripheral Interconnect, SPI, Flash memory) and non-volatile random-access memory (NVRAM), and may be generally configured to store software and/or firmware modules. The software and/or firmware modules stored within computer readable NV memory 160 may generally contain program instructions (or computer program code), which can be executed by host processor 110 (and/or other controllers included within the IHS) to instruct components of IHS 100 to perform various tasks and functions for the information handling system.

As shown in FIG. 2, computer readable NV memory 160 may be configured to store boot firmware (FW) 162 and other system firmware 164. Boot firmware 162 may include software and/or firmware modules for specifying hardware configuration settings, system date/time, boot sequence, etc. In some embodiments, boot firmware 162 may be implemented as a Basic Input/Output System (BIOS) and/or a Unified Extensible Firmware Interface (UEFI). System firmware 164 may include firmware executed by ISH 152, EC 180 and/or other controllers that may be included within the IHS. In some embodiments, system firmware 164 may include ISH service firmware 151 (see, FIG. 3), which can be executed by ISH 152 to evaluate and/or consolidate the sensor data and system state information received from sensors 154 and various IHS components (e.g., OS 172, driver layer 178, EC 180, NIC 190 and other hardware/software components 156).

Computer readable storage device 170 may be any type of persistent, non-transitory computer readable storage device, such as one or more hard disk drives (HDDs) or solid-state drives (SSDs), and may be generally configured to store software and/or data. Computer readable storage device 170 may be generally configured to store an operating system (OS) 172, in addition to other software modules and data. OS 172 may contain program instructions (or computer program code), which may be executed by host processor 110 to perform various tasks and functions for the information handling system and/or for the user. Although not restricted to such, OS 172 may be one of the many Windows® operating systems provided by Microsoft.

In addition to OS 172, computer readable storage device 170 may be configured to store a ticket management service (TMS) 174 and a ticket management policy database 176. As described in more detail below, ticket management service 174 is an OS-based service, which when executed by host processor 110, may be used to manage tickets based on contextual information (e.g., user presence and system state information) received from various IHS components and policies stored within ticket management policy database 176. In some embodiments, the tickets managed by TMS 174 may include ticket granting tickets (TGTs) and session tickets, which are issued to IHS 100 by a network authentication service (e.g., Kerberos) and temporarily stored within a local credentials cache or key store 122.

Embedded controller (EC) 180 is configured to boot the information handling system and perform other functions or tasks for the IHS. EC 180 may generally include read only memory (ROM), random access memory (RAM) and a processing device (e.g., a controller, microcontroller, microprocessor, ASIC, etc.) for executing program instructions stored within its internal ROM and RAM. For example, EC 180 may execute program instructions (e.g., a boot block) stored within its internal ROM to initiate a boot process for the information handling system. In some embodiments, EC 180 may provide system state information (e.g., battery state information, thermal and power management information and out-of-band manageability in power states S1-S5 information) to ISH 152 and/or ticket management service 174.

As shown in FIG. 2, EC 180 is coupled to PCH 150 for communicating battery information, which may be obtained from a rechargeable battery 182 or battery charger and power circuit 184, to ISH 152 and/or host processor 110.

Rechargeable battery 182 provides power to IHS 100 when the IHS is disconnected from an external power source 186. When IHS 100 is connected to an external power source 186, the battery charger and power control circuit 184 may be used to provide primary power to IHS 100, while the rechargeable battery 182 is used as a supplemental or dual power source. In some embodiments, EC 180 may communicate with a battery management unit (BMU) of rechargeable battery 182 via a System Management Bus (SMBus) to monitor one or more characteristics of the battery (e.g., charge rate, charge/discharge current, remaining state of charge, charge termination bit state, etc.) and to control battery recharge. In some embodiments, EC 180 may communicate this battery state information to ISH 152 and/or ticket management service 174 as system state information.

NIC 190 enables IHS 100 to communicate with one or more remotely located systems, resources and/or services via an external network 192 using one or more communication protocols. Network 192 may be a local area network (LAN), wide area network (WAN), personal area network (PAN), or the like, and the connection to and/or between IHS 100 and network 192 may be wired, wireless or a combination thereof. Although network 192 is indicated as a single collective component for simplicity, it is appreciated that network 192 may comprise one or more direct connections to other remotely located systems and/or services, as well as a more complex set of interconnections as can exist within a wide area network, such as the Internet. In some embodiments, IHS 100 may utilize NIC 190 to access one or more shared network resources 196 or service servers 198 across network 192.

In some embodiments, a user of IHS 100 may be authenticated by a network authentication service, such as Kerberos, so that only authorized users may gain access to the shared network resources 196 or service servers 198. As shown in FIG. 2, for example, a key distribution center (KDC) 192 may be used to authenticate users and issue tickets for accessing shared network resources 196 and service servers 198. As noted above, KDC 192 may include an authentication service (AS) and a ticket granting service (TGS).

To begin the authentication process, IHS 100 sends a session key request, along with a username and password, to key distribution center (KDC) 192 to access at least one network resource 196 or service server 198. If the username is found in the KDC database, the authentication service generates a session key and a ticket granting ticket (TGT), which is timestamped, encrypted with the user's password, and sent back to IHS 100 along with the session key. A user of the IHS 100 may then be prompted to enter a password. If the entered password matches the password stored in the KDC database, the encrypted TGT is decrypted, and the decrypted TGT and session key are stored as credentials in the local credential cache or key store 122.

To request access to network resources 196 or service servers 198, IHS 100 sends the decrypted TGT to the ticket granting service, which verifies trust with the network resources or service servers. If the user is authorized to access the network resources 196 or service servers 198, the ticket granting service sends a timestamped session ticket to IHS 100 that allows the IHS to access the network resources/services for a specified period of time. Like the session key and TGT, the timestamped session ticket is stored as a credential in key store 122. Once a session ticket is issued to an authorized user and stored in key store 122, the session ticket can be used to gain access to any number of network resources/services trusted by the authentication service. When the session ticket expires at the end of the specified time period, the session ticket is no longer valid and access to the network resources 196 or service servers 198 is revoked.

As noted above, tickets generated by the Kerberos network authentication service remain valid, and can be used to access network resources/services, until the time period specified for the ticket expires. In some cases, tickets may remain valid for a relatively long period of time (e.g., a number of hours up to a week or more), sometimes persisting through several user login cycles. This leaves the system and the network open to potential security problems. For example, if a system is set to infinite do not lock/sleep mode and an authorized user (e.g., a user that has been authenticated by the network authentication service) steps away from their system, an unauthorized user may gain access to the system and any network resources/services for which the authorized user was authenticated.

To improve system and network security, the present disclosure provides various embodiments of improved information handling systems and methods for managing tickets based on contextual information, such as user presence and system state information, and ticket management policy. Although not strictly limited to such, the systems and methods disclosed herein may be used, in some embodiments, to manage ticket granting tickets (TGTs) and/or session tickets generated by a network authentication service (such as Kerberos). As described in more detail below, the systems and methods disclosed herein may manage tickets by receiving user presence information and system state information, comparing the user presence information and system state information to policies contained within a ticket management policy database, and performing one or more actions if the user presence information or the system state information is not compliant with one or more of the policies.

Figure 3:
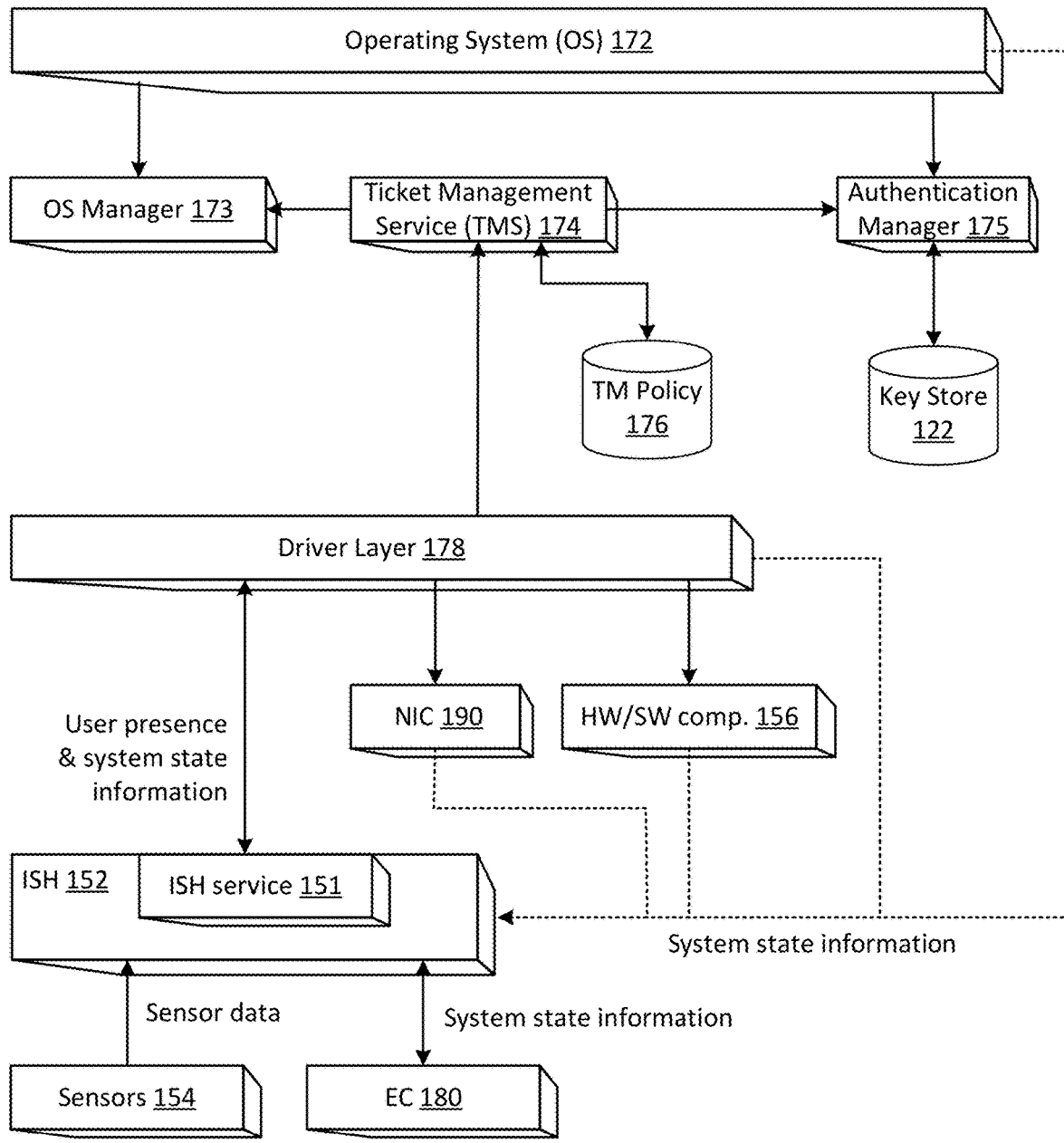
FIG. 3 is a block diagram illustrating how the ticket management service (TMS) shown in FIG. 2 may communicate with hardware and software components of the IHS to manage tickets based on user presence information, system state information and ticket management policies.

One embodiment of an improved information handling system (IHS) 100 in accordance with the present disclosure is illustrated in FIGS. 2 and 3. In general, IHS 100 improves upon conventional IHSs by including an OS-based ticket management service (TMS) 174 for managing tickets based on contextual information and ticket management policy, and a ticket management policy database 176 containing one or more policies for ticket management. In general, ticket management service 174 may manage tickets based on contextual information received from various hardware, software and/or firmware components of the IHS. For example, ticket management service 174 may use user presence information received from ISH 152 (or sensor data received directly from sensors 154) to manage tickets based on user presence. In addition, ticket management service 174 may use system state information received from various hardware and/or software components of the IHS (e.g., OS 172, driver layer 178, EC 180, NIC 190, and/or additional hardware/software components 156) to manage tickets based on system state.

FIG. 3 illustrates further details of the improved IHS 100 shown in FIG. 2. More specifically, FIG. 3 illustrates how various hardware, software and/or firmware components of the IHS may communicate to manage the tickets stored within the local credentials cache or key store 122 based on user presence information, system state information and ticket management policies. When a user logs in to IHS 100, OS 172 provides user login credentials (e.g., username and password) to OS Manager 173. OS Manager 173 provides OS management functions, which ticket management service 174 may interact with to control the power state of the IHS (e.g., lock, suspend, power down, etc.). Authentication manager 175 collects credentials (including, e.g., user login credentials, session keys, TGT's and session tickets) and stores them within key store 122. In addition, authentication manager 175 performs all authentication functions locally within IHS 100 and remotely with the network authentication service and any resources that leverage the credentials managed by the authentication manager. In some embodiments, ticket management service 174 may interact with authentication manager 175 to manage the tickets (e.g., destroy or temporarily revoke one or more tickets) stored within the key store 122.

In some embodiments, ticket management service 174 may begin receiving user presence information and system state information upon user login to the IHS 100. As noted above, ISH 152 may receive system state information from various software and/or hardware components of the IHS (such as, e.g., OS 172, driver layer 178, EC 180, NIC 190 and additional hardware/software components 156), and may use the sensor data received from sensors 154 to generate user presence information. In some embodiments, ISH 152 may forward the user presence and system state information to ticket management service 174. In other embodiments, ISH 152 may execute program instructions within ISH service 151 to evaluate and/or consolidate the user presence and system state information before it is sent to ticket management service 174. In yet other embodiments, ISH 152 may be omitted, and the sensor data and system state information may be supplied directly from sensors 154, hardware/software components 156, OS 172, driver layer 178, EC 180, and NIC 190 to ticket management service 174. When ISH 152 is omitted, ticket management service 174 may be coupled to receive system state information from various software and/or hardware components of the IHS (such as, e.g., OS 172, driver layer 178, EC 180, NIC 190 and additional hardware/software components 156), and may use the sensor data received from sensors 154 to generate user presence information.

During OS runtime, ticket management service 174 is executed by host processor 110 to compare user presence and system state information to the policies stored within ticket management policy database 176 to determine if the IHS 100 is in a secure or a compromised state. If ticket management service 174 determines that the user presence and system state information are compliant with ticket management policy, the IHS is considered to be in a secure state, and the ticket management service may continue to monitor user presence and system state. When the IHS is secure, no ticket management actions are performed and the tickets stored within key store 122 remain valid until they expire.

However, ticket management service 174 may determine that the IHS has been compromised if the user presence information and/or the system state information is not compliant with ticket management policy. There are numerous ways in which an IHS may be considered to be compromised. For example, an IHS may be compromised if ticket management service 174 detects: (a) user absence for at least a specified duration of time (e.g., 5 minutes or more), (b) significant movement of the user in a location, pattern or velocity that is different from a learnt behavior, (c) a change in network connection (e.g., a change in wireless pairing state or a connection to a different network or domain), (d) a change in USB connection state, (e) a change in geographic location (e.g., from a secured location to a non-secure location), etc. Other circumstances, or combinations of circumstances, may also cause ticket management service 174 to determine that an IHS has been compromised.

If the user presence information and/or the system state information is not compliant with ticket management policy, ticket management service 174 may perform one or more actions specified in the ticket management policy. In some embodiments, ticket management service 174 may use an interrupt mechanism to interrupt OS 172 and enter a non-compliance mode. Upon entering the non-compliance mode, ticket management service 174 may automatically initiate remediation and perform one or more actions as required by the ticket management policy.

In some embodiments, ticket management service 174 may perform one or more actions to manage the tickets stored within key store 122 if the user presence or system state information is not compliant with ticket management policy. For example, ticket management service 174 may destroy or temporarily revoke one or more of the tickets stored within key store 122 if the user presence or system state information is not compliant with ticket management policy. By managing tickets based on user presence information, system state information and ticket management policy, ticket management service 174 prevents a user of the IHS from accessing shared network resources/services when the IHS is in a compromised state.

In some embodiments, ticket management service 174 may also perform one or more actions to control the power state of the IHS (e.g., lock, suspend, shut down, etc.) if the user presence or system state information is not compliant with ticket management policy. For example, ticket management service 174 may lock the IHS (or the user session) if user presence is not detected, or if a user is absent for at least a specified duration of time (e.g., 5 minutes or more). In doing so, ticket management service 174 may prevent unauthorized users from accessing shared network resources/services by requiring new authentication when the user returns.

FIG. 4 illustrates one example of ticket management policies that may be stored within ticket management policy database 176. The ticket management policies shown in FIG. 4 specify a variety of actions that may be performed based on user presence information (e.g., Yes, No or Any) and system state information, such as geographic location (e.g., the IHS is located in a primary facility, a secure location within a primary facility, a second tier facility, a non-secure location or any location) and wireless pairing (e.g., Yes, No or Any). It is noted that the present disclosure is not limited to the ticket management policies expressly shown in FIG. 4, and may include additional or alternative ticket management policies that perform a variety of actions based on user presence and system state information.

In some embodiments, ticket management service 174 may determine that the user presence and system state information is compliant with ticket management policy 200 if user presence is detected (Yes) at an IHS located in a primary facility (e.g., a Dell corporate facility) regardless of wireless pairing state (Any). When user presence and system state information is determined to be compliant with ticket management policy 200, the tickets stored within key store 122 and the power state of the IHS are maintained, so that an authorized user can use the IHS to access network resources/services for which the user was previously authenticated.

If the authorized user steps away from the IHS located in the primary facility, and user presence is no longer detected (No), ticket management service 174 may determine that the user presence information is not compliant with ticket management policy 210. If this occurs, ticket management service 174 may lock the user session, but maintain the tickets stored within key store 122. In doing so, ticket management service 174 may prevent unauthorized users from accessing shared network resources/services while the authorized user is absent from the IHS by locking the user session and requiring new authentication when the authorized user returns.

Ticket management policies 220, 230, 240, 250 and 260 provide additional examples of actions that may be performed when user presence information and/or system state information is not compliant with policy. For example, one or more tickets may be quarantined (per ticket management policy 220) when user presence is detected (Yes), but a wireless pairing is not detected (No), at an IHS located in a secured location within a primary facility (e.g., a secure lab within a Dell corporate facility). When tickets are quarantined, they are temporarily revoked or removed from key store 122. In some embodiments, the quarantined tickets may be reinserted into key store 122 when user presence and system state information are back in compliance with ticket management policy.

In another example, an IHS located in a second tier facility (e.g., a Dell sales facility) may be locked (per ticket management policy 230) when wireless pairing is not detected (No) regardless of user presence/absence (Any). In another example, a Workspace One ticket may be removed from key store 122 (per ticket management policy 240) if user presence is not detected (No) at an IHS located anywhere, regardless of wireless pairing state (Any). In another example, all tickets may be destroyed (per ticket management policy 250) if user presence is not detected (No) and wireless pairing is not detected (No) at an IHS located in a non-secure location (e.g., a coffee shop).

Figure 5:
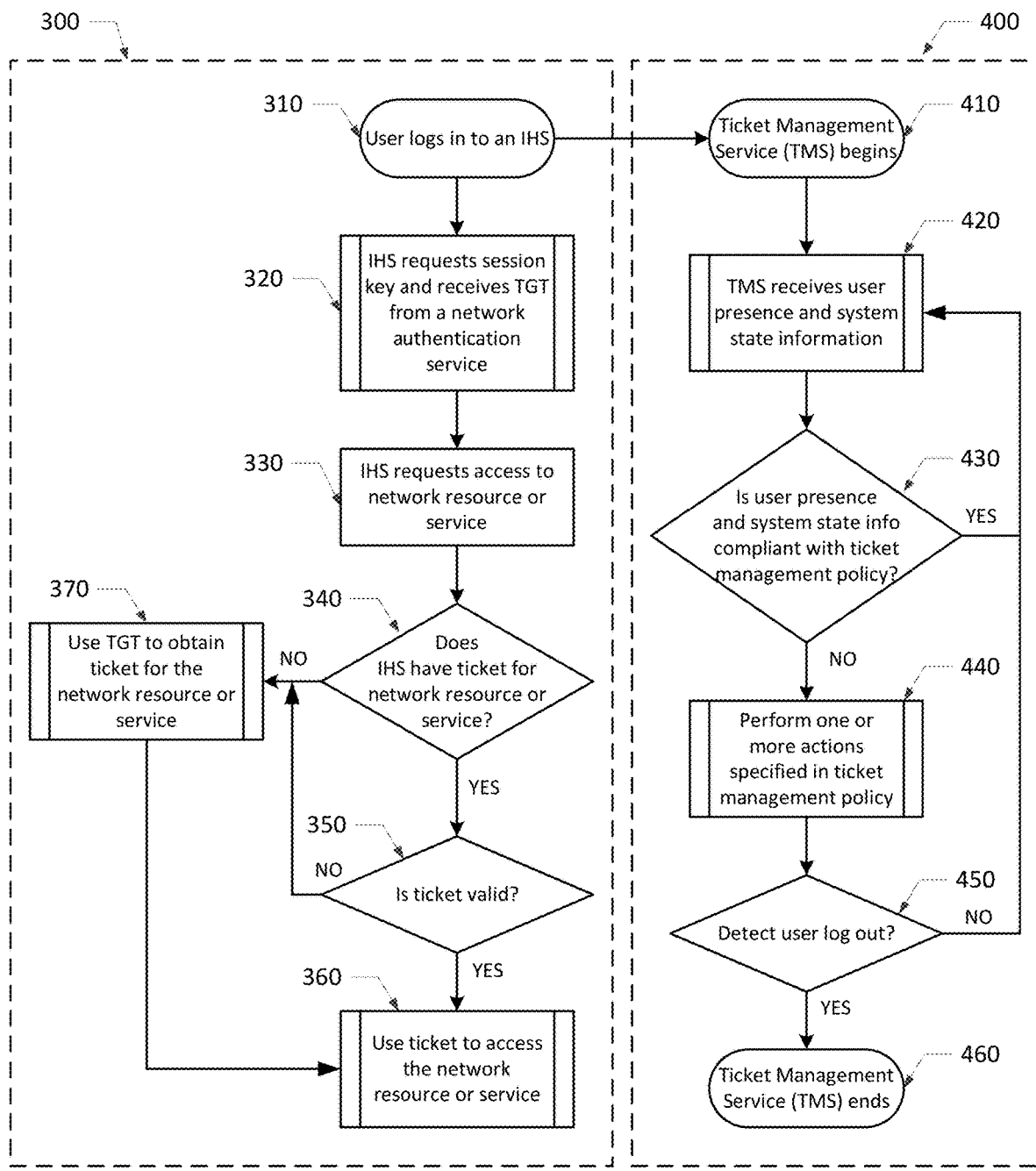
FIG. 5 is a flowchart diagram illustrating one embodiment of a method that may be used to manage tickets based on user presence information, system state information and ticket management policies.

FIG. 5 illustrates one embodiment of a method that may be used to manage tickets in accordance with the present disclosure. More specifically, the method (400) shown on the right-hand side of FIG. 5 may be used to manage tickets (e.g., TGTs, session tickets or both) that are issued to an IHS by a network authentication service (e.g., KDC 192) when an authorized user logs into the IHS and requests access to a shared network resource or service. The method (300) shown on the left-hand side of FIG. 5 illustrates the steps performed by the IHS to request access to the shared network resource or service, and to use the tickets issued by the network authentication service to access the shared network resource or service.

As shown on the left-hand side of FIG. 5, method 300 may generally begin when an authorized user logs in to an IHS (in step 310). As used herein, an authorized user is one which provides the correct login credentials (e.g., username and password) to log into the IHS and to gain access to shared network resources/services. In step 320, the IHS may request a session key and receive a ticket-granting ticket (TGT) from a network authentication service. Once the TGT is received, decrypted and stored within local key store 122, the IHS may request access to at least one shared network resource or service (in step 330). If the IHS already has a session ticket for accessing the shared network resource/service (YES branch of step 340), and the session ticket is valid (YES branch of step 350), the IHS may use the session ticket to access the shared network resource/service (in step 360). If a session ticket has not yet been obtained (NO branch of step 340), the IHS may send the TGT back to the network authentication service to verify trust and obtain a session ticket (in step 370). If the user is authorized to access the shared network resource/service, the network authentication service may send a session ticket that allows the IHS to access the shared network resource/service for a specified time period. Once the session ticket is stored within local key store 122, the session ticket can be used to access the shared network resource/service (in step 360) until the time period expires and the session ticket is invalidated.

As shown on the right-hand side of FIG. 5, method 400 may generally begin (in step 410) when an authorized user logs into the IHS (in step 310). Upon user login, a ticket management service is automatically executed by a processing device of the IHS to manage tickets, which are issued by the network authentication service and stored within the local key store. As noted above, the tickets managed by the ticket management service may include TGTs, session tickets or both. As indicated below, the processing device may continue to execute the ticket management service until the authorized user logs out of the IHS.

In step 420, the ticket management service receives user presence and system state information from at least one IHS component. In some embodiments, the ticket management service may receive user presence and system state information from an integrated sensor hub (e.g., ISH 152) included within the IHS. In other embodiments, the ticket management service may receive user presence and system state information directly from other hardware and/or software components of the IHS (such as, e.g., sensors 154, hardware/software components 156, OS 172, driver layer 178, EC 180, and/or NIC 190). In general, the ticket management service may begin to receive user presence and system state information upon user login, and may continue to receive user presence and system state information until the user logs out of the IHS (in step 450). In other words, the ticket management service may continue to monitor user presence and system state (in step 420) as long as the user remains logged into the IHS.

In step 430, the ticket management service determines if the user presence and system state information is compliant with ticket management policies stored within the IHS. As noted above, the ticket management policies may specify a variety of actions to be performed based on user presence and system state. In some embodiments, the ticket management policies may specify actions that can be used to manage the tickets (e.g., destroy or temporarily revoke one or more tickets), which are issued by the network authentication service and stored within a key store of the IHS, if the user presence information and/or the system state information is not compliant with at least one ticket management policy. In some embodiments, the ticket management policies may also specify actions to control the power state of the IHS (e.g., lock, suspend, power down, etc.) if the user presence information and/or the system state information is not compliant with at least one ticket management policy.

If the ticket management service determines that the user presence information and the system state information are compliant with the ticket management policies (YES branch of step 430), the ticket management service may determine that the IHS is secure and may continue to monitor user presence and system state (in step 420). If the ticket management service determines that the user presence information and/or the system state information is not compliant with at least one ticket management policy (NO branch of step 430), however, the ticket management service may perform one or more actions specified in the at least one ticket management policy (in step 440).

Figure 6A:
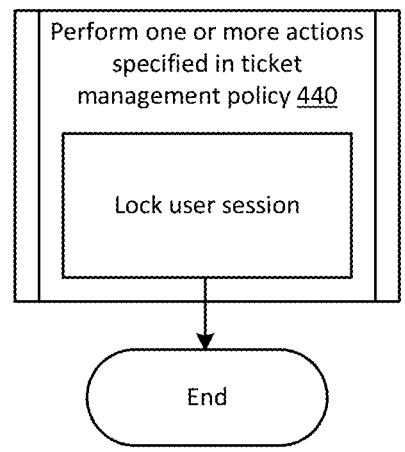
FIG. 6A is a flowchart diagram illustrating one example of a ticket management action that may be performed in the method shown in FIG. 5 if user presence and/or system state information is not compliant with ticket management policy.
Figure 6B:
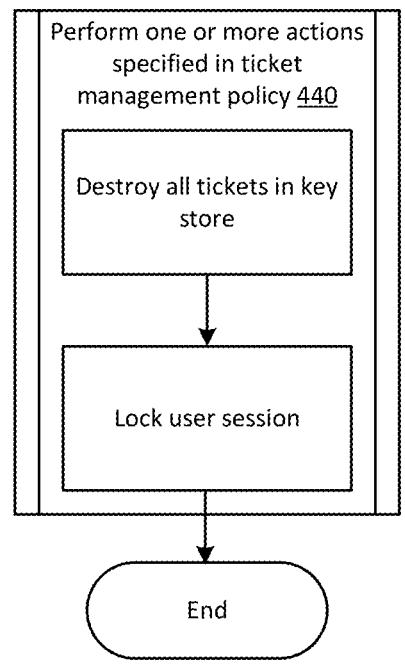
FIG. 6B is a flowchart diagram illustrating another example of a ticket management action that may be performed in the method shown in FIG. 5 if user presence and/or system state information is not compliant with ticket management policy.
Figure 6C:
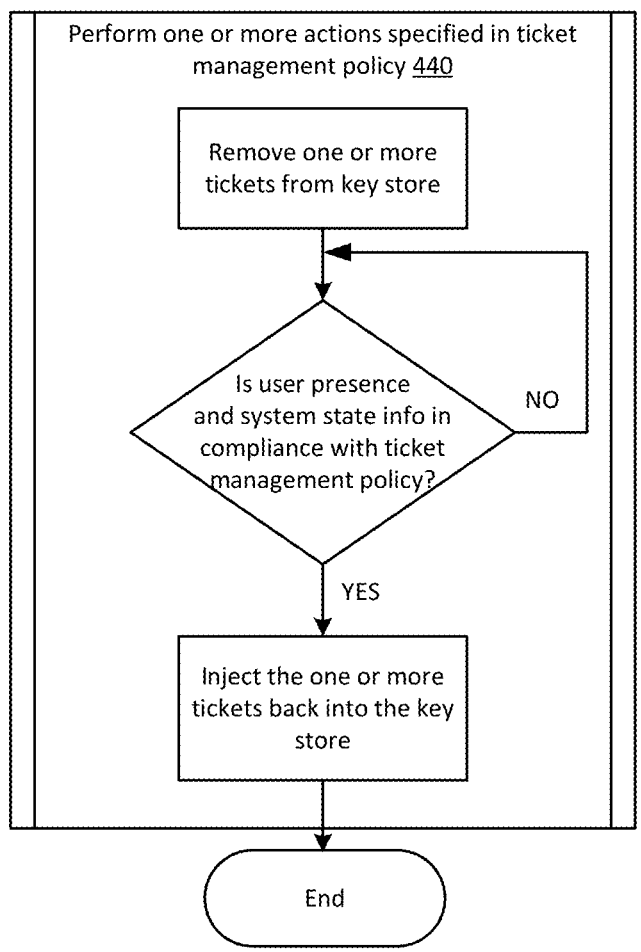
FIG. 6C is a flowchart diagram illustrating yet another example of a ticket management action that may be performed in the method shown in FIG. 5 if user presence and/or system state information is not compliant with ticket management policy.

FIGS. 6A-6C provide various examples of actions that may be performed (in step 440) if the ticket management service determines that the user presence information and/or the system state information is not compliant with at least one ticket management policy (NO branch of step 430). It is noted that the actions shown in FIGS. 6A-6C are provided as examples of actions that may be performed in step 440 of method 400. It is further noted that method 400 is not strictly limited to the example actions shown in FIGS. 6A-6C. In other embodiments, alternative actions may be performed in step 440 including, but not limited to, any of the individual actions or combinations of actions shown in FIGS. 4 and 6A-6C and discussed herein.

In some embodiments, the ticket management service may lock the user session in step 440, as shown in FIG. 6A. In other embodiments, the ticket management service may destroy all tickets in the key store and lock the user session in step 440, as shown in FIG. 6B. In other embodiments, the ticket management service may quarantine one or more of the tickets contained within the key store (in step 440). As shown in FIG. 6C, for example, the ticket management service may temporarily remove one or more tickets from the key store until the user presence and system state information received by the ticket management service is compliant with ticket management policy. When the ticket management service determines that the user presence and system state information is compliant with ticket management policy, the ticket management service may reinsert the one or more tickets back into the key store.

In step 450, the ticket management service determines if the authorized user has logged out of the IHS. As long as the authorized user remains logged in (NO branch of step 450), the ticket management service may continue to receive user presence and system state information (in step 420), determine if the user presence information and system state information is compliant with ticket management policies (in step 430), and perform one or more actions specified in at least one ticket management policy (in step 440) if the user presence information and/or the system state information is not compliant with the at least one ticket management policy (NO branch of step 430).

If the ticket management service determines that the authorized user has logged out of the IHS (YES branch of step 450), the processing device may stop executing the ticket management service and method 400 may end. In some embodiments, the tickets stored within the key store may be revoked when the authorized user logs out of the IHS.

Method 400 is a computer implemented method performed, at least in part, by a processing device (e.g., host processor 110) of an information handling system (e.g., IHS 100) by executing program instructions (e.g., program instructions contained within ticket management service 174) stored within a computer readable storage device (e.g., computer readable storage device 170). Unlike conventional information handling systems, computer implemented method 400 improves the way in which an information handling system functions, in at least one respect, by managing tickets and/or controlling a power state of the IHS based on user presence information, system state information and ticket management policy. In doing so, computer implemented method 400 improves information handling system and network security by preventing access to shared network resources/services when an IHS is determined to be in a compromised state.

It will be understood that one or more of the tasks, functions, or methodologies described herein may be implemented, for example, as firmware or as a computer program of instructions, which are embodied in a non-transitory tangible computer readable medium and executed by one or more processing devices. The computer program of instructions may generally include an ordered listing of executable instructions for implementing logical functions within the IHS, or within a component thereof. The executable instructions may include a plurality of code segments operable to instruct components of the information handling system to perform the methodologies disclosed herein. It will also be understood that one or more steps of the present methodologies may be employed in one or more code segments of a computer program. For example, a code segment executed by the information handling system may include one or more steps of the disclosed methodologies.

It will be understood that one or more processing devices may be configured to execute or otherwise be programmed with software, firmware, logic, and/or other program instructions, which are stored within one or more non-transitory tangible computer-readable mediums to perform the operations, tasks, functions, or actions described herein for the disclosed embodiments. The one or more processing devices may include, e.g., a central processing unit (CPU), controller, microcontroller, processor, microprocessor, field programmable gate array (FPGA), application specific integrated circuit (ASIC), or other suitable processing device. The one or more non-transitory tangible computer-readable mediums may include, e.g., data storage devices, flash memories, random update memories, read only memories, programmable memory devices, reprogrammable storage devices, hard drives, floppy disks, DVDs, CD-ROMs, and/or any other tangible data storage mediums.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. A computer implemented method to manage valid tickets issued to an information handling system (IHS) by a network authentication service, wherein the computer implemented method is performed by a processing device of the IHS executing program instructions, which are contained within a ticket management service stored within a computer readable storage device of the IHS, and wherein the computer implemented method comprises:

receiving user presence information and system state information from at least one IHS component, wherein the user presence information indicates whether or not a user is physically present at the IHS, and wherein the system state information comprises information about the IHS, which is received from at least one hardware or software component included within the IHS;

determining if the user presence information and the system state information are compliant with ticket management policies stored within the IHS;

performing one or more actions specified in at least one of the ticket management policies if the user presence information is not compliant with the at least one ticket management policy; and performing the one or more actions specified in at least one of the ticket management policies if the system state information is not compliant with the at least one ticket management policy;

wherein said performing the one or more actions comprises quarantining or destroying one or more of the valid tickets that have not expired, which are issued to the IHS by the network authentication service and stored within a key store of the IHS.

2. The computer implemented method as recited in claim 1, further comprising repeating said receiving and said determining if the user presence information and the system state information is compliant with the ticket management policies.

3. The computer implemented method as recited in claim 1, wherein said receiving comprises receiving the user presence information and the system state information from an integrated sensor hub (ISH) included within the IHS.

4. The computer implemented method as recited in claim 1, wherein said receiving comprises receiving the user presence information and the system state information from a plurality of hardware and software components of the IHS.

5. The computer implemented method as recited in claim 1, wherein said receiving comprises receiving the user presence information and the system state information upon user login to the IHS, and continuing to receive the user presence information and the system state information until the user logs out of the IHS.

6. The computer implemented method as recited in claim 1, wherein said quarantining comprises:
temporarily removing the one or more valid tickets from the key store when the user presence information or the system state information is not compliant with the at least one ticket management policy; and
reinserting the one or more valid tickets into the key store when user presence information and the system state information are back in compliance with the ticket management policies.

7. The computer implemented method as recited in claim 1, wherein said performing one or more actions further comprises controlling a power state of the IHS.

8. The computer implemented method as recited in claim 7, wherein said controlling the power state of the IHS comprises locking, suspending or powering down the IHS.

9. The computer implemented method as recited in claim 1, wherein said receiving the system state information comprises receiving one or more of the following:
geographic location and/or system performance data from an operating system of the IHS;
battery state information, thermal and power management information and/or out-of-band manageability in power states information from an embedded controller included within the IHS;
system driver information from a driver layer of the IHS;
network information from a network interface controller included within the IHS;
a wireless pairing state of a Bluetooth device from a Bluetooth controller included within of the IHS;
audio activity from an audio controller included within the IHS;
a current connection state of a USB device from a USB controller included within the IHS;
geographic location information form a GPS sensor included within the IHS;
acceleration information from an accelerometer included within the IHS;
orientation and angular velocity information from a gyroscope included within the IHS; and
lid position or display mode from a laptop hinge rotation sensor included within the IHS.

10. The computer implemented method as recited in claim 1, further comprising removing one or more of the valid tickets from the key store while performing the determining if the user presence information and the system state information are compliant with the at least one ticket management policy; and then returning the removed valid tickets back to the key store only if it is determined that both the user presence information and the system state information are compliant with the at least one ticket management policy.

11. The computer implemented method as recited in claim 1, further comprising performing only one of the following based on whether or not the user presence information and the system state information is compliant with the at least one ticket management policy:
performing the one or more actions specified in the at least one of the ticket management policies for valid tickets that have not expired if the user presence information is not compliant with the at least one ticket management policy, and performing the one or more actions specified in the at least one of the ticket management policies for valid tickets that have not expired if the system state information is not compliant with the at least one ticket management policy;
or
using the valid tickets that have not expired to access a shared network resource or service only if both the user presence information and the system state information is compliant with the at least one ticket management policy.

12. The computer implemented method as recited in claim 1, further comprising performing the one or more actions specified in at least one of the ticket management policies for valid tickets that have not expired if the system state information is not compliant with the at least one ticket management policy.

13. The computer implemented method as recited in claim 1, wherein said performing the one or more actions comprises destroying one or more of the valid tickets that have not expired, which are issued to the IHS by the network authentication service and stored within a key store of the IHS, only if the user presence information or the system state information is not compliant with the at least one ticket management policy.

14. The computer implemented method as recited in claim 13, where each of the valid tickets that has not expired is valid for a specified time period that has not yet expired.

15. An information handling system (IHS), comprising:
a system memory comprising a key store for storing tickets supplied to the IHS by a network authentication service, wherein the tickets stored within the key store are valid tickets until they expire and become invalid tickets, and wherein invalid tickets are deleted from the key store;
a computer readable storage device that stores an operating system (OS), a ticket management service for managing the valid tickets stored within the key store, and a ticket management policy database containing policies that specify actions performed by the ticket management service based on user presence and system state; and a host processor that executes program instructions contained within the ticket management service during OS runtime to:
  receive user presence information and system state information, wherein the user presence information indicates whether or not a user is physically present at the IHS, and wherein the system state information comprises information about the IHS, which is received from at least one hardware or software component included within the IHS;
  compare the user presence information and the system state information to the policies contained within ticket management policy database;
  perform one or more actions specified in the policies if the user presence information is not compliant with at least one of the policies; and
  perform the one or more actions specified in the policies if the system state information is not compliant with at least one of the policies;
  wherein the one or more actions specified in the policies comprise actions for quarantining or destroying one or more of the valid tickets that have not expired and that are stored within the key store.

16. The information handling system as recited in claim 15, wherein the host processor begins executing the program instructions contained within the ticket management service when a user logs into the IHS and continues executing the program instructions until the user logs out of the IHS.

17. The information handling system as recited in claim 15, further comprising:
  one or more sensors for collecting sensor data used to generate the user presence information; and
  a plurality of hardware and software components for collecting the system state information.

18. The information handling system as recited in claim 17, wherein the one or more sensors comprise one or more of the following: a camera, an eye tracking device, a time-of-flight sensor, a motion sensor, an infrared (IR) sensor, a temperature sensor, an acoustic sensor, a vibration sensor, a proximity sensor and radar.

19. The information handling system as recited in claim 17, wherein the plurality of hardware and software components comprise two or more of the following: the operating system, a driver layer, an embedded controller, a network interface controller, a Bluetooth controller, an audio controller, a Universal Serial Bus (USB) controller, a Global Positioning System (GPS) sensor, an accelerometer, a gyroscope, and a laptop hinge rotation sensor.

20. The information handling system as recited in claim 17, further comprising an integrated sensor hub (ISH) coupled to the one or more sensors and the plurality of hardware and software components, wherein the ISH is configured to evaluate and/or consolidate the user presence information and the system state information before sending the user presence information and the system state information to the ticket management service.

21. The information handling system as recited in claim 15, wherein the actions for quarantining the one or more valid tickets comprise:
  temporarily removing the one or more valid tickets from the key store when the user presence information or the system state information is not compliant with the at least one of the policies; and
  reinserting the one or more valid tickets into the key store when the user presence information and the system state information are back in compliance with the policies.

22. The information handling system as recited in claim 15, wherein the one or more actions specified in the policies further comprise actions for controlling a power state of the IHS.

23. The information handling system as recited in claim 22, wherein the actions for controlling the power state of the IHS comprise locking, suspending or powering down the IHS.

24. The information handling system as recited in claim 15, wherein the system state information comprises one or more of the following:
  geographic location and/or system performance data received from an operating system of the IHS;
  battery state information, thermal and power management information and/or out-of-band manageability in power states information received from an embedded controller included within the IHS;
  system driver information received from a driver layer of the IHS;
  network information received from a network interface controller included within the IHS;
  a wireless pairing state of a Bluetooth device received from a Bluetooth controller included within of the IHS;
  audio activity received from an audio controller included within the IHS;
  a current connection state of a USB device received from a USB controller included within the IHS;
  geographic location information received form a GPS sensor included within the IHS;
  acceleration information received from an accelerometer included within the IHS;
  orientation and angular velocity information received from a gyroscope included within the IHS; and
  lid position or display mode received from a laptop hinge rotation sensor included within the IHS.

25. The information handling system as recited in claim 15, where the host processor executes to:
  remove one or more of the valid tickets from the key store while comparing the user presence information and the system state information to the policies contained within the ticket management policy database if the user presence information and the system state information are compliant with at least one of the policies; and
  then return the removed valid tickets back to the key store only if both the user presence information and the system state information is compliant with the at least one of the policies.

26. The information handling system as recited in claim 15, wherein the host processor executes during the OS runtime to perform only one of the following based on whether or not the user presence information and the system state information is compliant with the at least one ticket management policy:
  perform the one or more actions specified in the policies for valid tickets that have not expired if the user presence information is not compliant with at least one of the policies, and perform the one or more actions specified in the policies for valid tickets that have not expired if the system state information is not compliant with at least one of the policies;
  or
  use the valid tickets that have not expired to access a shared network resource or service only if both the user presence information and the system state information is compliant with the at least one of the policies.

27. The information handling system as recited in claim 15, wherein the host processor executes during the OS runtime to perform the one or more actions specified in the policies for valid tickets that have not expired if the system state information is not compliant with the at least one of the policies.

28. The information handling system as recited in claim 15, wherein the one or more actions specified in the policies comprise destroying one or more of the valid tickets that have not expired and are stored within the key store only if the user presence information or the system state information is not compliant with at least one of the policies.

29. The information handling system as recited in claim 28, where each of the valid tickets that has not expired is valid for a specified time period that has not yet expired.

* * * * *